United States Patent
Rautenberg et al.

(10) Patent No.: US 9,197,046 B2
(45) Date of Patent: Nov. 24, 2015

(54) EXTENDABLE-LENGTH ENCAPSULATING HOUSING ARRANGEMENT FOR AN ENCAPSULATED ELECTRICAL ENERGY TRANSMISSION DEVICE

(75) Inventors: Steffen Rautenberg, Berlin (DE); Markus Schmidtke, Hohen Neuendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 122 days.

(21) Appl. No.: 13/985,334

(22) PCT Filed: Feb. 7, 2012

(86) PCT No.: PCT/EP2012/052017
§ 371 (c)(1),
(2), (4) Date: Aug. 14, 2013

(87) PCT Pub. No.: WO2012/110356
PCT Pub. Date: Aug. 23, 2012

(65) Prior Publication Data
US 2014/0060881 A1     Mar. 6, 2014

(30) Foreign Application Priority Data
Feb. 14, 2011   (DE) .................. 10 2011 004 032

(51) Int. Cl.
| | | |
|---|---|---|
| H02G 3/04 | (2006.01) | |
| H02B 13/045 | (2006.01) | |
| F16L 27/12 | (2006.01) | |

(Continued)

(52) U.S. Cl.
CPC .............. H02G 3/0462 (2013.01); F16L 27/12 (2013.01); H02B 13/045 (2013.01); H02B 13/005 (2013.01); H02G 5/002 (2013.01)

(58) Field of Classification Search
CPC ..... H02G 3/04; H02G 3/0406; H02G 3/0431; H02G 3/0437; H02G 3/06; H02G 3/0608; H02G 3/0616; H02G 3/00; H02G 3/0462; H02G 5/002; F16L 25/02; F16L 25/12; F16L 25/10; F16L 25/14; F16L 27/12; H02B 13/005; H02B 13/045
USPC .......... 174/481, 68.1, 68.3, 72 R, 72 C, 72 A, 174/88 R, 70 C, 86; 248/49, 68.1; 138/111, 138/117
See application file for complete search history.

(56) References Cited

U.S. PATENT DOCUMENTS

| | | | |
|---|---|---|---|
| 3,061,665 A | 10/1962 | Rugg et al. | |
| 3,573,344 A * | 4/1971 | Snyder | 174/481 |
| 3,907,334 A * | 9/1975 | Schera, Jr. | 174/86 |

(Continued)

FOREIGN PATENT DOCUMENTS

| | | |
|---|---|---|
| CN | 1260902 A | 7/2000 |
| CN | 201260060 Y | 6/2009 |

(Continued)

*Primary Examiner* — Angel R Estrada
(74) *Attorney, Agent, or Firm* — Laurence Greenberg; Werner Stemer; Ralph Locher

(57) ABSTRACT

A variable length encapsulation housing configuration for an encapsulated electrical energy transmission device has a first encapsulation housing with a sliding surface and a second encapsulation housing supported in a sliding manner on the sliding surface of the first encapsulation housing. The first encapsulation housing has a supporting body on which a coating is applied to form the sliding surface.

6 Claims, 1 Drawing Sheet

(51) Int. Cl.
*H02B 13/00* (2006.01)
*H02G 5/00* (2006.01)

(56) References Cited

U.S. PATENT DOCUMENTS

| | | | | |
|---|---|---|---|---|
| 5,661,263 | A | * | 8/1997 | Salvaggio ................. 174/68.3 |
| 5,892,806 | A | | 4/1999 | Scott |
| 6,143,984 | A | * | 11/2000 | Auteri ..................... 174/68.3 |
| 6,521,835 | B1 | * | 2/2003 | Walsh ..................... 174/68.3 |
| 7,183,502 | B1 | * | 2/2007 | Johnston et al. .......... 174/68.3 |
| 7,550,669 | B2 | * | 6/2009 | Rizzuto, Jr. .............. 174/68.1 |
| 2009/0266796 | A1 | | 10/2009 | Kisanuki |
| 2011/0000922 | A1 | | 1/2011 | Barz et al. |

FOREIGN PATENT DOCUMENTS

| | | |
|---|---|---|
| CN | 101660646 A | 3/2010 |
| DE | 1927784 A1 | 12/1970 |
| DE | 2603040 A1 | 8/1977 |
| DE | 7818357 U1 | 9/1978 |
| DE | 2824623 A1 | 12/1978 |
| DE | 102008027644 A1 | 12/2009 |
| DE | 102010018063 A1 | 10/2011 |
| EP | 2003756 A1 | 12/2008 |
| FR | 2048513 A5 | 3/1971 |
| FR | 2217840 A1 | 9/1974 |
| WO | 2009103688 A1 | 8/2009 |
| WO | 2009147120 A1 | 12/2009 |

* cited by examiner

EXTENDABLE-LENGTH ENCAPSULATING HOUSING ARRANGEMENT FOR AN ENCAPSULATED ELECTRICAL ENERGY TRANSMISSION DEVICE

BACKGROUND OF THE INVENTION

Field of the Invention

The invention relates to a variable length encapsulation housing arrangement for an encapsulated electrical energy transmission device having a first encapsulation housing with a sliding surface and a second encapsulation housing which is supported in a sliding manner on the sliding surface of the first encapsulation housing.

An encapsulation housing arrangement of this kind is disclosed for example in application DE 26 03 040 A1. This describes an encapsulation housing arrangement which has a first and a second encapsulation housing. The disclosed encapsulation housings are each designed in the form of a tube and project into one another in a telescopic manner. In order to promote a relative movement between the encapsulation housings, it is provided that sliding bodies in the form of plastic guide rings are fitted. Alternatively, it is proposed that one of the encapsulation housings be formed from an elastic material so that changes in length are compensated by deformations of the elastic material. Although this avoids a sliding guide, the long-term stability of the deformable material is questionable.

The use of plastic guide rings leads to a reduction in frictional forces and to a smooth-running relative movement of the two encapsulation housings with respect to one another. However, stability outdoors is problematic. In particular, moisture can collect and together with dust affect the plastic guide rings. The plastic guide rings can therefore wear prematurely.

BRIEF SUMMARY OF THE INVENTION

The object of the invention is therefore to specify a variable length encapsulation arrangement which can also be used reliably under outdoor conditions.

According to the invention, the object is achieved with a variable length encapsulation arrangement of the kind mentioned in the introduction in that the first encapsulation housing has a supporting body on which a coating is applied to form the sliding surface.

A supporting body of an encapsulation housing gives the encapsulation housing an angularly rigid structure. A supporting body can be a metallic body, for example. For instance, the supporting body can be a cast body made from non-ferrous metal such as aluminum, brass or appropriate alloys. The supporting body can form a fluid-tight wall for an encapsulation housing. In a simple case, an encapsulation housing can have a one-piece supporting body.

It is advantageous to manufacture the encapsulation housing in the form of cast parts made from a non-ferrous metal. Sleeve surfaces, for example, of a tubular section of the first encapsulation housing can be designed as a sliding surface. In doing so, a sliding surface can be arranged on inner sleeve surfaces as well as on outer sleeve surfaces of the first encapsulation housing. Accordingly, the second encapsulation housing encompasses an outer sleeve surface of the first encapsulation housing, or an inner sleeve surface of the first encapsulation housing encompasses the second encapsulation housing. Tubular sections of the first and second encapsulation housing respectively overlap one another so that an inherently closed circumferential joint gap is formed between them. The two encapsulation housings can be slid axially relative to one another. The second encapsulation housing rests in a sliding manner on the sliding surface of the first encapsulation housing. The second encapsulation housing can be equipped with sliding elements for this purpose.

Coating a supporting body of the first encapsulation housing enables the surface quality of the sliding surface to be manipulated. The quality of the surface can vary depending on the conditions of use. Coating can reduce the risk of the stick-slip effect occurring. The stick-slip effect is to be feared particularly when a relative movement occurs between the two encapsulation housings relatively rarely.

The coating can also act as a corrosion protection layer so that the quality of the sliding surface is not changed disadvantageously due to corrosion. The coating can be subjected to weathering at least in sections. Advantageously, the coating should adhere to the supporting body in a fluid-tight manner. This makes it more difficult for the coating to detach from the supporting body. Particularly when using the encapsulation housing arrangement in a compressed-gas-insulated electrical energy transmission device, the coating can be used as part of a pressure-tight fluid-tight encapsulation. For example, a sealing element can rest in a fluid-tight sliding manner on the sliding surface to form a seal. The coating can be designed as an inherently closed ring, for example. The ring can be arranged circumferentially in the form of a strip on the first encapsulation housing on the inner sleeve side or outer sleeve side.

Advantageously, it can be provided that the coating is applied to the supporting body in the fluid state and subsequently hardens on the supporting body.

An advantageous embodiment can provide that the coating is a metallic coating.

A metallic coating has a good resistance to frictional forces so that premature wear is not to be expected. Furthermore, a metallic coating constitutes a fluid-tight barrier so that a coating of this kind can beneficially be used in compressed-gas-insulated switchgear. For example, low-corrosion stainless steels can be used to be able to form a coating on the first encapsulation housing. Stainless steels can be applied directly onto aluminum cast bodies, for example. Here, the steels protect covered areas mechanically as well as against direct chemical effects.

A metallic coating can be sprayed on, for example. Spray coating enables a coating with a thickness of several hundred μm to be applied. This coating is bonded to the surface of the supporting body in a fluid-tight manner. A direct bond enables auxiliary materials to be dispensed with. Further, the electrical potential of the supporting body can also easily be transmitted to the coating. Before applying, a metal can be changed to a fluid state by the action of heat and sprayed onto the supporting body of the encapsulation housing. A thermal spray method, such as a plasma spray method for example, can be used for this purpose. However, a cold gas spray method can also be used. Additives can also be mixed into the spray jet so that the coating produced can consist of a mixture of different materials.

A further advantageous design can provide that the coating is a layer of varnish.

Realizing the coating by means of a varnish is cost effective. Varnishing can be carried out in short working cycles. Depending on the environmental influences to be expected, adequate sealing with the first encapsulation housing can be achieved. Examples of suitable varnishes are multi-component varnishes, which are easy to process.

Further, it can advantageously be provided that friction-reducing particles, in particular plastic particles, are incorporated into the coating.

The particles have a reduced sliding friction compared with the material in which they are incorporated. The particles form parts of the surface of the sliding surface layer. Incorporating plastic particles enables the second encapsulation housing to slide on the sliding surface layer with low friction. Compared with discrete sliding elements, the plastic particles can be incorporated into the sliding surface layer over large areas. The plastic particles are encompassed by the varnish or metallic coating and embedded therein. This protects the plastic particles against mechanical overloads. In particular, it is possible to facilitate a favorable transition from static friction to sliding friction during a relative movement. Organic plastics, such as PTFE (polytetrafluoroethylene) for example, have been shown to be suitable plastics. The plastic can be applied together with the coating for the sliding surface layer. For example, the plastic particles can already be present in the uncured varnish and be applied together with this to the first encapsulation housing. Varnishes of this kind are also referred to as lubricant varnishes.

Advantageously, it can further be provided that the coating is machined after applying to the supporting body.

Machining, such as for example turning, milling, grinding etc., enables the quality of the sliding surface to be additionally manipulated. The fit of the sliding surface with respect to the second encapsulation housing can be matched by machining. Furthermore, it is possible to expose incorporated particles, thus resulting in a large contact area with the particles in order to reduce sliding friction.

Furthermore, it can advantageously be provided that the coating is part of a fluid-tight sliding seal between the first and the second encapsulation housing.

The encapsulation housings can contain a fluid, in particular an insulating gas, in their interior. In order to prevent an unwanted escape of the gas, a fluid-tight seal must be provided between the encapsulation housings. The seal must be designed in such a way that, as far as possible, a change in length of the encapsulation housing arrangement is not counteracted. A sliding seal can therefore be formed on the coating by pressing a sealing element against the coating to give a fluid-tight bond between the two encapsulation housings. The sealing element slides over the coating and encircles the axial direction in which a change in length is provided. The sealing element can be mounted in a stationary manner on the second encapsulation housing for example. For instance, the sealing element can be mounted in the form of a ring in a slot of the second encapsulation housing.

Furthermore, it can advantageously be provided that a contact element, in particular a sliding contact, connects the two encapsulation housings to one another.

A permanent electrical connection of the two encapsulation housings should also be provided for potential equalization when the encapsulation housings move relative to one another. The contact element bridges a joint gap formed between the encapsulation housings. In this way, the encapsulation housings each have the same electrical potential. The occurrence of discharges between the encapsulation housings is avoided. The encapsulation housings should be designed to be electrically conducting.

In the following, an exemplary embodiment of the invention is shown schematically in a drawing and subsequently described in more detail.

In the drawing:

DESCRIPTION OF THE INVENTION

Figure 1:
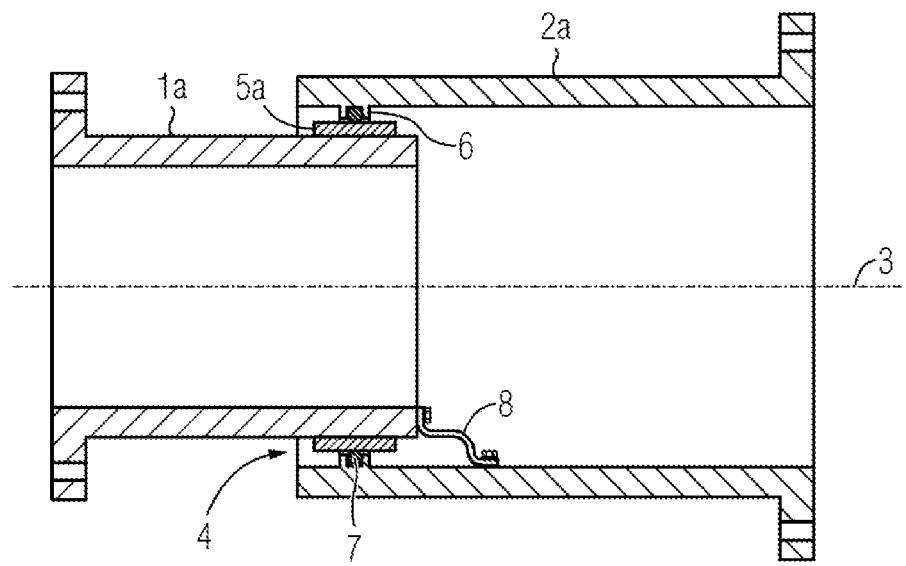
FIG. 1 shows a section through a first encapsulation housing arrangement.

The first encapsulation housing arrangement shown in FIG. 1 has a first encapsulation housing 1a and a second encapsulation housing 2a. The encapsulation housings 1a, 2a are tubular in design and aligned coaxially with respect to a main axis 3. At the same time, the cross section of the first encapsulation housing 1a is chosen in such a way that the first encapsulation housing 1a can be encompassed by the second encapsulation housing 2a while forming a joint gap 4. The two encapsulation housings 1a, 2a can be moved relative to one another along the main axis 3 so that the length of the first encapsulation housing arrangement can be varied in the direction of the main axis 3.

The encapsulation housings 1a, 2a are each equipped with annular flanges at the ends facing away from the joint gap 4.

The encapsulation housings 1a, 2a can be connected to further assemblies by means of the annular flanges. The opposite ends can also be sealed in a fluid-tight manner so that a fluid can be contained in the interior of the first encapsulation housing arrangement. In this way, disk insulators for example, through which one or more phase conductors pass in the direction of the main axis 3, can be arranged on the annular flanges. The interior of the first encapsulation housing arrangement can, for example, be filled with an insulating gas at increased pressure, thus ensuring an electrical insulation of the phase conductor with respect to the encapsulation housings 1a, 2a in the interior of the first encapsulation housing arrangement by means of the insulating gas.

The first encapsulation housing 1a has a sliding surface 5a in order to also ensure a fluid-tight bond in the region of the joint 4. The sliding surface 5a is formed by a coating of an outer sleeve of the first encapsulation housing 1a. The sliding surface 5a encircles the main axis 3 in an inherently closed manner. In the present case, the coating has been applied to a supporting body made of cast aluminum by spraying on a stainless steel using a plasma spraying method. When the coating was complete, a sliding surface 5a in the form of a circular cylindrical sleeve was created by machining. Alternatively, the first encapsulation housing 1a can also be varnished to form the sliding surface 5a. Regardless of the type of coating, friction-reducing particles can be embedded in the coating. The embedded particles then form parts of the outer surface of the sliding surface 5a.

The second encapsulation housing 2a is equipped with an annular shoulder 6, which protrudes on the inner sleeve side, in the region of the joint gap 4. The annular shoulder 6 carries a sealing element 7 which is pressed against the sliding surface 5a. The sealing element 7 forms a fluid-tight barrier between the sliding surface 5a of the first encapsulation housing 1a and the annular shoulder 6 of the second encapsulation housing 2a. Furthermore, a sealing element 7 can also be mounted on the second encapsulation housing 2a, for example in an annular slot, while dispensing with a protruding annular shoulder 6.

Additional sliding bearings can be arranged in the region of the joint gap 4 to facilitate guidance of the encapsulation housings 1*a*, 2*a*. For example, one or more guide rings, which impart a supporting and guiding effect and thus protect the sealing element 7 against mechanical overload, can be positioned on the second encapsulation housing 2*a* axially offset with respect to the annular shoulder 6.

The first encapsulation housing 1*a* and the second encapsulation housing 2*a* are connected to one another by means of a flexible conductor wire which acts as a contact element 8.

Figure 2:
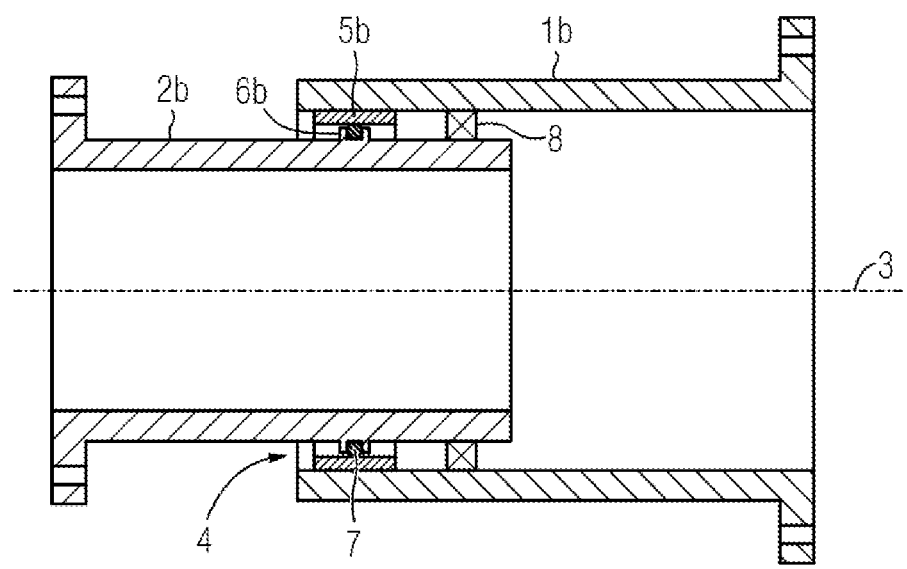
FIG. 2 shows a section through a second encapsulation housing arrangement.

A second encapsulation housing arrangement is shown in FIG. 2. The construction of the second encapsulation housing arrangement substantially corresponds to the construction of the first encapsulation housing arrangement. For this reason, only differences will be discussed below.

In contrast to the first encapsulation housing arrangement, the dimensions of a first encapsulation housing 1*b* are such that it encompasses a second encapsulation housing 2*b* on an outer sleeve side. The two encapsulation housings 1*b*, 2*b* overlap one another and form a joint gap 4. The two encapsulation housings 1*b*, 2*b* can be slid relative to one another along a main axis 3.

A sliding surface 5*b* is arranged on the first encapsulation housing 1*b* on an inner sleeve side in the region of the joint gap 4. Correspondingly, an annular shoulder 6*b* is arranged on the second encapsulation housing 2*b* on an outer sleeve side in the vicinity of the joint gap 4. A fluid-tight seal of the joint gap 4 between the first and second encapsulation housing 1*b*, 2*b* is achieved by means of a sealing element 7 mounted on the annular shoulder 6*b*. For this purpose, the sealing element 7, which encircles the annular shoulder 6*b* in radial directions, is pressed against the sliding surface 5*b* of the first encapsulation housing 1*b*. Furthermore, a sealing element can also be placed on the second encapsulation housing 2*b*, for example in an annular slot, while dispensing with a protruding annular shoulder 6*b*.

A sliding contact arrangement in the form of a circumferential garter spring is arranged in the joint gap 4 as contact element 8 in order to make electrical contact with the encapsulation housings 1*b*, 2*b*.

The invention claimed is:

1. A variable length encapsulation housing configuration for an encapsulated electrical energy transmission device, the variable length encapsulation housing configuration comprising:
   a first encapsulation housing having a sliding surface;
   a second encapsulation housing supported in a sliding manner on said sliding surface of said first encapsulation housing;
   said first encapsulation housing having a supporting body on which a coating is applied to form said sliding surface, said coating is a layer of varnish; and
   friction-reducing particles formed from plastic disposed in said varnish.

2. The variable length encapsulation housing configuration according to claim 1, wherein said coating is a metallic coating.

3. The variable length encapsulation housing configuration according to claim 1, wherein said coating is machined after being applied to said supporting body.

4. The variable length encapsulation housing configuration according to claim 1, wherein said coating is part of a fluid-tight sliding seal between said first encapsulation housing and said second encapsulation housing.

5. The variable length encapsulation housing configuration according to claim 1, further comprising a contact element connecting said first and second encapsulation housings to one another.

6. The variable length encapsulation housing configuration according to claim 5, wherein said contact element is a sliding contact.

* * * * *